United States Patent
Boucher et al.

(10) Patent No.: US 6,421,994 B1
(45) Date of Patent: Jul. 23, 2002

(54) MOWING IMPLEMENT

(75) Inventors: Jean Francois Boucher, Gray; Roger Franet, Sarreguemines, both of (FR); Larry Neil Smith; Matthew Jay Mentzer, both of Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/690,535

(22) Filed: Oct. 17, 2000

(30) Foreign Application Priority Data

Oct. 21, 1999 (DE) .......................................... 199 50 748

(51) Int. Cl.[7] .............................................. A01D 43/10
(52) U.S. Cl. ....................................................... 56/192
(58) Field of Search .............................. 56/192, 193, 1, 56/DIG. 9, DIG. 21

(56) References Cited

U.S. PATENT DOCUMENTS

| | | | | |
|---|---|---|---|---|
| 3,059,403 A | * | 10/1962 | Bamford et al. | |
| 3,221,484 A | * | 12/1965 | Van der Lely | |
| 3,841,070 A | * | 10/1974 | Scarnato et al. | 56/14.4 |
| 4,078,366 A | * | 3/1978 | Carmichael | 56/377 |
| 4,251,980 A | * | 2/1981 | Miller | 56/14.4 |
| 4,601,162 A | * | 7/1986 | Wessel | 56/13.6 |
| 4,691,504 A | * | 9/1987 | Glunk | 56/192 |
| 5,351,468 A | * | 10/1994 | Pominville | 56/192 |

FOREIGN PATENT DOCUMENTS

| | | |
|---|---|---|
| CH | 658 364 A5 | 11/1986 |
| DE | 128 889 | 12/1977 |
| DE | 44 22 502 A1 | 6/1995 |

* cited by examiner

Primary Examiner—Christopher J. Novosad

(57) ABSTRACT

A mower-conditioner includes a conditioning device which is mounted for being selectively shifted transverse the direction of travel so as to be offset relative to the longitudinal centerline of the mowing device. Associated with the conditioning device is a crop guide device which may be selectively adjusted to cause a narrowed stream of conditioned crop to be deposited to opposite sides of a longitudinal centerline of the conditioning device.

8 Claims, 1 Drawing Sheet

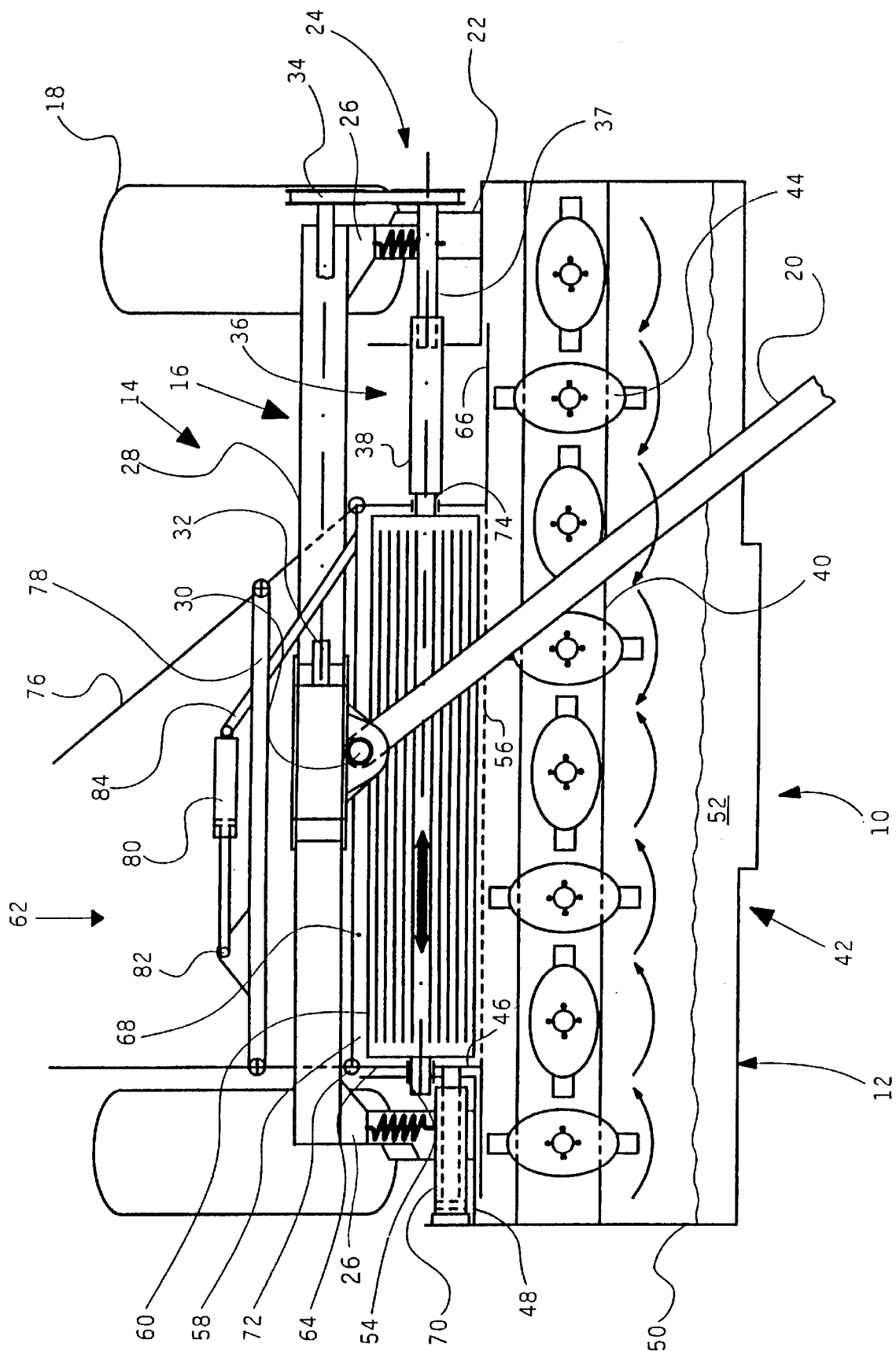

US 6,421,994 B1

MOWING IMPLEMENT

The invention concerns a mowing implement with a mowing device and a mowed crop conditioning device.

BACKGROUND OF THE INVENTION

Mowing implements for grains, like grass, are known in the form of mower-tedders or mower-conditioners, in which a cutter bar with an oscillating blade or mowing disk is provided on the front and a mowed crop conditioning device with a tined rotor or crimping rolls is provided in the rear. Alignment of both devices occurs essentially symmetric to a longitudinal center axis of the mowing implement so that a swath is formed almost in the center behind the mowing implement.

On the other hand, it is also already known that a mowed crop conditioning device can be mounted rigidly on the mowing implement in a position offset laterally relative to the mowing device. In this manner, a vehicle is offered a broader track during subsequent cutting.

In addition, DE-A1-44 22 502 discloses a mowing implement with a second harvested crop conditioning device that discharges the harvested crop along a path offset laterally relative to the longitudinal axis of the mowing implement.

The problem underlying the invention is seen in the fact that the cost for a second mowed crop conditioning device to achieve lateral offset is significant and that the use of a mowed crop conditioning device mounted laterally offset relative to the mowing device restricts the versatility of such a mowing implement.

SUMMARY OF THE INVENTION

According to the present invention, there is provided a mower-conditioner having the capability of depositing conditioned crop along a path offset laterally to the longitudinal centerline of the mowing implement.

An object of the present invention is to provide a mowed crop conditioning device having the ability to deposit crop along a path offset laterally to the longitudinal centerline of the mowing implement without restricting the versatility of the mowing implement.

In this manner the mowed crop conditioning device can be placed in different positions with reference to the direction of travel so that leftward or rightward offset or center depositing of the mowed crop can be achieved. Moreover, for road transport the mowed crop conditioning device can also be brought into a position within the admissible road transport width.

A mowed crop conditioning device with a more limited pickup width relative to the mowing device can be moved relative to the mowing device within certain limits without surpassing its outer edges.

In order to always achieve disturbance-free crop flow on the cutting site of the mowing device and mowed crop conditioning device and to maintain the geometric relation between the side walls of the mowed crop conditioning device, it is proposed that the mowing device be accommodated in a housing with a rear wall having a discharge opening and that the mowed crop conditioning device be mounted in a housing with a front wall which is situated with the rear wall to the side of the discharge opening and accepts the mowed crop through its own receiving opening.

The drive of the moving mowed crop conditioning device can occur in principle by means of a hydraulic motor, an angular gear or traction mechanism that is adjusted to the corresponding position of the mowed crop conditioning device. A technically simple solution with limited loss of efficiency in any case is seen in the use of a telescoping shaft, which is brought to a required length. As an alternative to this, a hydraulic motor could also be used, which is directly mounted on the shaft 74 or connected to it.

An adjustment, especially shift of the mowed crop conditioning device across the direction of travel by means of a servomotor or, in general, by means of an operating element, has the advantage that this can be conducted from a vehicle and during operation.

To support and/or increase the laterally offset discharge possibility, a guide device consisting especially of guide plates can be used, which is laterally adjustable, for example, pivotable. When the guide plates are mounted on the mowed crop conditioning device, they also retain their relative position to it during adjustment and require no final guiding.

The use of several servomotors makes it possible to increase or reduce lateral offset of the swath relative to the mowing device independently of adjustment of the mowed crop conditioning device.

By means of control or regulation, which, depending on the operating state, for example, grouping of swaths, individual discharge, manual or sensor-controlled causing lateral or central discharge of the mowed crop, optimal employment of the mowing implement can be achieved.

When the mowing device contains a cutter bar with several mowing disks whose direction of rotation is aligned relative to the center of crop flow, the mowed crop is always fed into its center or close to center receiving region regardless of the position of the mowed crop conditioning device.

A supporting connection between the mowed crop conditioning device and the mowing device means that the relative position of the two is also retained during rough operation on the field and with the presence of a spring suspension, this can be used for both in common.

BRIEF DESCRIPTION OF THE DRAWING

The sole FIGURE is a somewhat schematic top view of a mowing implement provided with a crop conditioning device constructed in accordance with the present invention.

DESCRIPTION OF THE PREFERRED EMBODIMENT

Referring now to the drawing, there is shown a mowing implement 10 including a mowing device 12 and a mowed crop conditioning device 14.

The mowing implement 10 in this example is shown as a towed, so-called mowerconditioner, which has, among other things, a frame 16 supported on a pair of ground wheels 18. A tongue 20 is has a rear end pivotally coupled to the frame and extends forward from there for being coupled to a towing vehicle. The mowing device 12 is suspended from the frame 16 by a spring suspension 22, and provided for driving the mowing device 12 and crop conditioning device 14 is a drive shown partly at 24.

The mowing implement 10 serves for mowing of crops, for example, grass, and subsequent conditioning so that this mowed harvested crop dries more quickly. The working width of the mowing implement is ordinarily 3 to 4.5 m. The harvested crop mowed by it is deposited from a rear end location in a swath that is significantly narrower than the working width. The mowing implement 10 is here shown designed as a disk mower but the present invention is just as applicable to mowing implements designed as a drum mower, sickle bar mower or the like, for example.

The frame 16 is designed essentially in the form of a bridge or upside down "U". A pair of transversely spaced arms 26 extend downwardly from opposite ends of a transverse support 28 and serve to support the wheels 18 for rotating about a horizontal transverse axis. The support 28 has a pair of vertically space ears fixed to a center region thereof, the ears having a rear end of the tongue received therebetween and pivotally coupled by a pin extending vertically through the ears and the rear end of the tongue 20.

The wheels 18 are arranged so that they are situated within the outer limits of the mowing device 12 when viewed in the direction of travel.

The hitch 20 serves to support a drive shaft (not shown) that leads from the towing vehicle to drive 24. The connection between the pin 30 and the hitch 20 is designed so that the hitch 20 can be pivoted over a range of about 1800. This means that the mowing implement 10 can be pulled into positions with almost any lateral displacement relative to the longitudinal center axis of the towing vehicle. In practical examples deviating from this, the hitch 20 can naturally also be connected outside of the center of frame 16.

The suspension 22 is of the usual design and contains several springs and rods (not shown) that connect the mowing device 12 to the mowed crop conditioning device 14 with relative vertical movement on frame 16. By the suspension 22, the unit consisting of the mowing device 12 and mowed crop conditioning device 14 can be adjusted in its spacing relative to the ground and cushioned against impact in its corresponding position.

The drive 24 is also in part designed as usual and includes a drive shaft (not shown) extending from a power-take-off, of the towing vehicle, to an angular gear assembly 31 located at the rear end of the end of the drive shaft and having a transverse output shaft 32 that is coupled to a pulley of a belt drive assembly 34 coupled to a telescopic shaft 36 including an outer fixed shaft part 37, integral with a pulley located in alignment with the first-mentioned pulley, and a moveable part 38 coupled to the mowed crop conditioning device 14.

The mowing device 12 includes a cutter bar 40 and supported within a platform housing 42 and is arranged on the front of mowing implement 10.

The cutter bar 40 in this special practical example contains a number of (namely eight) mowing disks 44 driven to rotate and arranged next to each other. As viewed from the top in the drawing, the four disks 44 to the left-hand side of the longitudinal center of the mowing implement 10 rotate counterclockwise and the four disks 44 on the right-hand side of the longitudinal centerline rotate clockwise. Together, the eight disks 44 determine the working width of the mowing implement 10. In an optimal consideration, conveyance of the mowed crop after the cutting process occurs between the two center mowing disks 44 rearward, since all mowing disks 44 transport the mowed crop inward, optionally with other mounted conveyor devices.

The housing 42 consists of opposite side walls 46, a rear wall 48, outer dividers 50 and a cover 52, which are screwed, welded, riveted or otherwise joined together in order to form the housing 42 in essentially one-part.

The side walls 46 extend vertically and in the direction of travel between the rear wall 46 and frame 16 and each has a bearing 54. The side walls 46 are offset inward relative to outer dividers 50 each by about ⅙ of the width of the mowing device 12. However, this dimension is not essential and depends in particular on the width of the mowing device 12 and of the mowed crop conditioning device 14.

The rear wall 48 connects the side walls 46 to the outer dividers 50, extends perpendicular and across the direction of travel over the entire width of the mowing device 12 and has a discharge opening 56. The width of the discharge opening 56 corresponds in each case essentially to the distance between the side walls 46. In a not shown variant, guide plates or the like could additionally be provided on the rear wall 48, which influence the feeding behavior of the mowed crop. The discharge opening can also be designed smaller than the distance between the side walls 46.

The outer dividers 50 close the mowing device 12 laterally and extend perpendicularly from the front edge of the mowing device 12 to rear wall 48. The outer dividers 50 accommodate the cutter bar 40 rigidly between them.

The cover 52 connects the side walls 46, rear wall 48 and outer dividers 50 in their upper region. In practical examples deviating from this, the cover 52 can also end on the mowed crop conditioning device 14.

The side walls 46, the rear wall 48, the outer dividers 50 and cover 52 are normally produced from sheet metal, but could also have plastic aprons for the flexible regions.

The mowed crop conditioning device 14 includes a housing 58, two mowed crop conditioning rolls 60 and a guide device 62.

The mowed crop conditioning device 14 is about half the width of the mowing device 12 in the region of the mowed crop conditioning roll 60 and is moveable, crosswise to the direction of travel, relative to, and over about ⅙ of the width of, the mowing device 12.

Housing 58 is open downward and also has side walls 64, a front wall 66 and a cover 68 in whose enclosed space the mowed crop conditioning rolls 60 are accommodated. A servomotor 70, designed as a double-acting hydraulic cylinder, is introduced between housing 58 and mowing device 12 and is operated by an operating device with hydraulic fluid (not shown). Because of its simplicity, the servomotor 70 is a preferred operating element for shifting the conditioning device 14, however, it should be understood that various other types of operating elements that are remotely controllable could be used without departing from the spirit of the invention. According to a schematic representation, the servomotor 70 has one end connected to the side wall 64 of the mowed crop conditioning device 14 and has its other end connected to the outer divider 50 of the mowing device 12. Deviating from this, the servomotor 70 can also engage at other positions as long as it is capable of moving the mowed crop conditioning device 14 laterally relative to mowing device 12. The housing 58 is connected to slide horizontally with the mowing device 12 in a manner not further shown, for example, by means of rails or the like, which accept both the weight of the mowed crop conditioning 14 and also always ensure its correct position relative to the mowing device 12.

The side walls 64 of the housing 58 correspond in position and size essentially to those of the mowing device 12. In their rear end region, the side walls 64 are each provided with a pivot bearing 72 defining a vertical pivot axis and are connected to the front wall 66 with their front end. The side walls 64 and the front wall 66 are at a right angle relative to each other. Between the left side wall 64, viewed in the forward direction of travel, and the corresponding side wall 46 of the mowing device 12 a free space of about ⅙ of the width of the mowing device 12 remains when the mowed crop conditioning device 14 is in its outermost right position.

The front wall 66 is about ⅙ narrower than the rear wall 48 of mowing device 12 and also has an opening through which the mowed crop can be fed to the mowed crop conditioning rolls 60.

The cover 68 connects the side walls 64 and front wall 66 and thus contributes to the development of a sturdy housing 58.

The mowed crop conditioning rolls 60, only the upper one being shown, can be driven in opposite directions. Each roll 60 may be formed from plastic so as to be profiled and so as to mesh with each other. Instead of two mowed crop conditioning rolls 60, any other type of conditioning elements can also be provided, for example, a flail rotor, brush roll or the like. The task of the mowed crop conditioning device 14 consists of the fact that the mowed crop is conditioned so that it dries more quickly and can be deposited from the rear of the mowing implement 10 in a swath on the ground. The location of the swath is important for later processing of the mowed crop. For example, two or three swaths should lie relatively close to each other so that they can be picked up by a single pickup of a field chopper. For this purpose it is advantageous if, in a first cut, a swath can be deposited to the right, during a second cut, a swath can be deposited in the center and, during a third cut, a swath can be deposited to the left. To achieve this, the mowed crop conditioning device 14 is arranged to be moved laterally. Each mowed crop conditioning roll 60 contains a central shaft 74 that serves for its mounting in the side wall 64 and for connection to drive 24. It is here noted, that in lieu of the drive 24, a hydraulic motor could be mounted directly to the shaft 74.

According to the drawing, the end region of shaft 74 lying to the left in the forward direction of travel with the moving shaft part 38 is rigidly connected in the direction of rotation and axially. The end region of the shaft 74, lying to the right in the forward direction of travel, is secured to rotate smoothly in the corresponding side wall 64 by means of a bearing (not shown). Between shafts 74 of the two mowed crop conditioning rolls 60, a traction mechanism (not shown) is situated with a chain that ensures synchronous rotation of the two mowed crop conditioning rolls 60.

The guide device 62 includes two guide plates 76, a spacer rod 78 and a servomotor 80. The task of the guide device 62 is to collect the mowed crop, released by the mowed crop conditioning rolls 60, into a swath that is narrower than the mowed crop conditioning rolls 60. This swath can also be deposited laterally offset opposite to or within the width of mowed crop conditioning rolls 60.

The guide plates 76 engage with their front end region in the pivot bearings 72 on the side walls 64 of housing 58 to pivot horizontally and extend a significant distance over the rear end region of mowing implement 10. The mowed crop grazes partially along the inner surfaces of the guide plates 76.

The spacer rod 78 has its opposite ends hinged to the guide plates 76 and determines the spacing between them. Although the practical example shows the spacer rod 78 to be of a fixed-length, a variable-length spacer rod could also be used. The spacer rod 78 is provided with a connection 82 of optional design of the servomotor 80.

Servomotor 80 is designed as a hydraulic motor or electric motor and serves to pivot the guide plates 76 together relative to housing 58. For this purpose the servomotor 80 engages on its free end a support 84, which itself is rigidly connected to the conditioner roll housing 58. The servomotor 80 can be operated together with, or separately from, the servomotor 70 of a controlled or regulated operating device (not shown).

According to all this, the following function is obtained.

The position of the mowed crop conditioning device 14 relative to mowing device 12 is determined by an operating person or by sensors, which establish, for example, the spacing relative to a lateral swath. At the beginning or also during the mowing process, the servomotor 70 is operated according to the settings of the operating person or the stipulated control or regulation.

It is assumed that the mowed crop conditioning device 14 is situated in its right-most position as considered when viewing the mower-conditioner 10 from the rear while facing in the forward direction of travel, this position being that depicted in the drawing. The crop conditioning device is then brought to its left-most or opposite end position and the swath is deposited to the left as far as possible by extending the servomotor 70 so that the crop conditioning device 14 overall and with the guide device 62 moves to the left. During this movement, the front wall 66 slides along the back wall 48 and always remains congruent with it. The two shaft parts 37 and 38 of telescopic shaft 36 also slide on each other and therefore keep their working connection. As a result of this movement, the guide device 62 also moves leftward; however, the position of the guide plates 76 does not change. To increase lateral offset, the servomotor 80 is now operated so as to retract. Since the support 84 is fixed, the spacer rod 78 is shifted to the left and with it the guide plates 76 are pivoted clockwise about their respective connections 72, which leads to depositing of the swath to the left when viewed from behind facing in the forward direction of travel.

Assignment

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

What is claimed is:

1. In a mowing implement including a mowing device for severing crop from the ground and delivering it rearwardly along a path of movement of said mowing device and a crop conditioning device located for receiving mowed crop directly from the mowing device and including at least one driven conditioning element contained within a housing having opposite end walls in which are mounted at least one drive shaft which is coupled for driving said at least one driven conditioning element, the improvement comprising: said crop conditioning device being mounted for adjustment laterally in its entirety with respect to said path of movement and, hence, to said mowing device.

2. The mowing implement according to claim 1, wherein said mowing device includes an elongate, transversely extending cutterbar; said at least one drive shaft of said crop conditioning device extending parallel to said cutterbar; and said conditioning device having a receiving width that is smaller than a working width of said mowing device.

3. The mowing implement according to claim 2, wherein said mowing device comprises a second housing including a rear wall provided with a delivery opening; and said housing of said crop conditioning device including a front wall provided with a receiving opening; and said front wall and rear wall being respectively disposed so as to partially overlap each other so that no gaps are left between said front and rear walls for the passage of crop regardless of the transverse position of said conditioning device relative to said mowing implement.

4. The mowing implement according to claim 1, wherein a telescopic input shaft section is coupled to one end of said at least one drive shaft for permitting said conditioning device to be adjusted laterally.

5. The mowing implement according to claim 1 and further including an extensible and retractable servomotor being arranged parallel to said drive shaft and coupled between said mowing device and crop conditioning device for selectively effecting adjustment of said conditioning device laterally with respect to said path of movement of said mowing device.

6. The mowing implement according to claim 1 and further including an adjustable guide device provided on an output side of said crop conditioning device.

7. The mowing implement according to claim 6 wherein said guide device includes at least one adjustable guide plate; and a second servomotor being coupled to said at least one guide plate for selectively altering its position.

8. The mowing implement according to claim 7 wherein said guide device includes right- and left-hand guide plates each mounted for pivoting about a respective vertical pivot axis located between its forward end and a respective right- and left-hand side wall of a housing of said conditioning device; a transverse tie bar having its opposite ends respectively pivotally connected to said right- and left-hand guide plates; and said second servomotor having its opposite end respectively coupled to said tie bar and to said housing of said conditioning device, whereby said second servomotor is selectively actuatable for swinging said guide plates about their pivotal connections.

* * * * *